No. 625,084. Patented May 16, 1899.
R. BROWN & J. R. DIXON.
CARBURETER.
(Application filed Jan. 26, 1899.)
(No Model.)
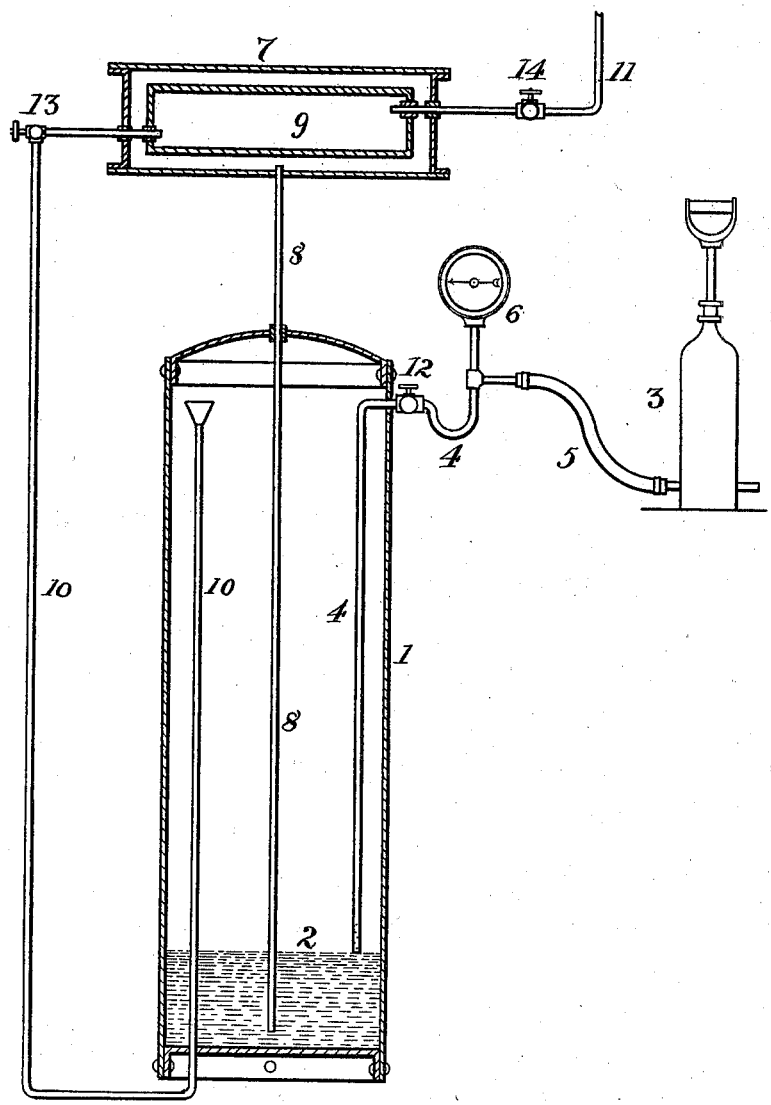
Witnesses:
F. J. Knapp
Jas. L. Butler
Inventors:
Richard Brown,
James R. Dixon,
by Humphrey & Humphrey
Atty's.

UNITED STATES PATENT OFFICE.

RICHARD BROWN AND JAMES R. DIXON, OF AKRON, OHIO.

CARBURETER.

SPECIFICATION forming part of Letters Patent No. 625,084, dated May 16, 1899.

Application filed January 26, 1899. Serial No. 703,418. (No model.)

*To all whom it may concern:*

Be it known that we, RICHARD BROWN and JAMES R. DIXON, citizens of the United States, residing at Akron, in the county of Summit and State of Ohio, have invented a certain new and useful Improvement in Gas-Machines, of which the following is a specification.

Our invention has relation to improvements in devices for converting gasolene into an inflammable vapor and mingling the vapor with atmospheric air to form an illuminating-gas.

The object of our invention is to produce a compact and efficient device whereby the vaporization of the gasolene and the admixture of air shall be performed only substantially as fast as the gas is needed for consumption, thereby avoiding the necessity for a gasometer and consequent danger of the accumlation of a large body of gas.

To the aforesaid object our invention consists in the peculiar and novel construction, arrangement, and combination of parts hereinafter described and then specifically pointed out in the claims, reference being had to the accompanying drawing, forming a part of this specification.

The accompanying drawing shows an elevation of our apparatus with the gasolene-tank and mixer in section.

Referring to the drawing, 1 is a closed sheet-metal tank supplied with gasolene 2 from time to time, so as to be partially filled. Connected with this tank is an air-pump 3, provided with a pipe 4, which extends nearly to the bottom of the tank. A part of this pipe 5 is, for convenience of moving the pump and to avoid rigidity, made of rubber hose.

Connected with the pipe 4 is a pressure-gage 6 to indicate the amount of pressure in the tank. Located above the tank 1 is a closed cylindrical sheet-metal box 7, internally connected with the tank 1 by a pipe 8, that extends nearly to the bottom of the tank 1 and is submerged in the gasolene, and suspended centrally within the box 7 is a porous closed cylinder 9 of non-absorbent material and which we preferably construct of unglazed earthenware or terra-cotta. A pipe 10 leads from near the inner top of the tank 1 through one end of the box 7 into one end of the porous cylinder 9. A second pipe 11 leads from the opposite end of the cylinder 9 through the opposite end of the box 7 to the burners. The pipes 4, 10, and 11 are provided with cocks 12 13 14, by which they may be severally closed.

In operation the cylinder 1 is charged with air under pressure by the pump 3. The effect of this pressure is to drive the gasolene up through the pipe 8 into the box 7 and around the porous cylinder 9. This pressure also drives the air from the inside of the tank 1, where it measurably mingles with the vapor of the gasolene, through the pipe 10 into the porous cylinder 9, and thence it passes in the form of gas through the pipe 11, when required, to the burners. The effect of the pressure of air on the gasolene in the box 7 about the cylinder 9 is to cause it to filter through that porous cylinder and to mix with and be taken up by the air that passes through that cylinder, forming of the two an illuminating-gas. This process will be active whenever the pressure in the cylinder 9 is decreased by opening the cock 14 to permit the gas to flow to the burners and will be measurably arrested when that cock is closed, thus enabling the machine to manufacture gas as it is needed for use and preventing the accumulation of gasolene in the porous cylinder 9, the fluid returning by gravitation to the bottom of the tank.

We claim—

1. In a gas-machine of the kind specified the combination with a tank containing gasolene, of a box located vertically above the tank having a closed porous cylinder of non-absorbent material suspended therein, a pipe leading from the gasolene in the tank to the inside of the box outside of the porous cylinder, a pipe leading from the top of the gasolene-tank into the porous cylinder, a pipe leading from said cylinder to the burners and a pump to force air into said gasolene-tank, all arranged substantially as shown and described.

2. In a gas-machine of the kind specified a closed box, and a porous cylinder of non-absorbent material supported therein, pipes leading into and from said porous cylinder, means for forcing air through said pipes and cylinder, and means for maintaining a supply of gasolene under pressure in said box about said cylinder substantially as shown and described.

In testimony that we claim the above we hereunto set our hands.

RICHARD BROWN.
JAMES R. DIXON.

In presence of—
C. P. HUMPHREY,
C. E. HUMPHREY.